United States Patent Office 3,449,093
Patented June 10, 1969

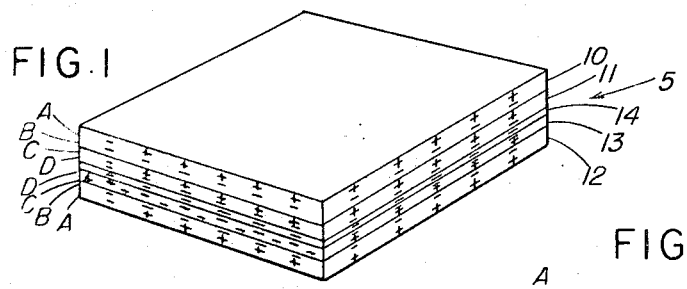
FIG.1
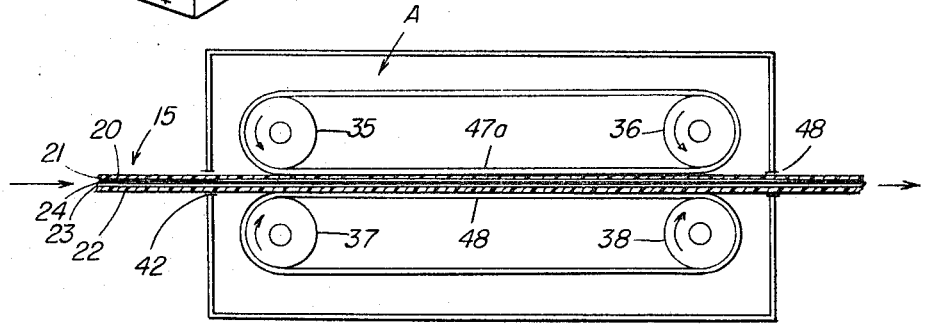
FIG.2
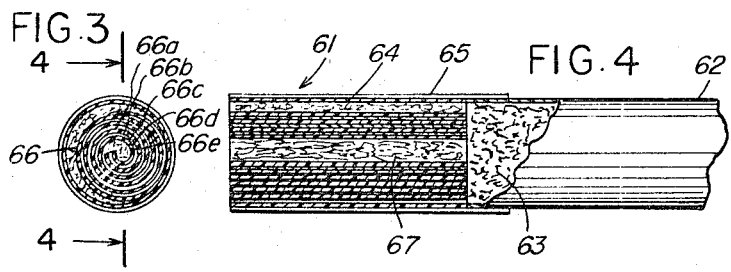
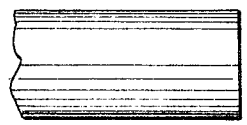
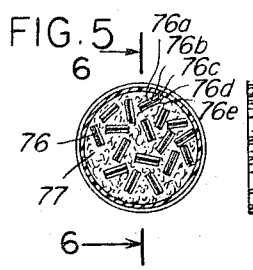
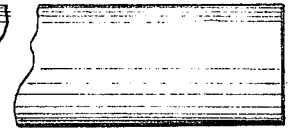
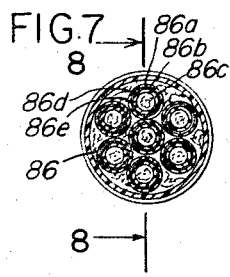
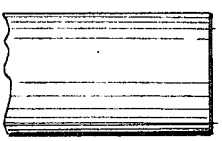

3,449,093
LAMINATED POLARETS
Lawrence M. Baxt, John R. McDowell, and Lawrence L. Stewart, Richmond, Va., assignors to Philip Morris Incorporated, New York, N.Y., a corporation of Virginia
Filed Oct. 23, 1965, Ser. No. 503,244
Int. Cl. B32b 15/04; H01b 3/00
U.S. Cl. 29—195                                          6 Claims

ABSTRACT OF THE DISCLOSURE

An electrically charged sandwich structure including two electrified substances each having opposite sides one of which has an adherent layer of conducting material, and an electrically conductive adhesive joining the layers of conducting material.

---

This invention relates to polaret structures, methods for their production and filters containing the same. More particularly, the present invention relates to polaret structures comprising sandwiches made of pairs of metallized polarets prepared from metallized plastic sheets comprising a plastic having an electrical charge, to methods for preparaing the same and to novel filter constructions embodying such sandwiches.

The term "polaret" is employed throughout this specification to designate an electrified substance which exhibits electrical charges of opposite sign on opposite faces, the charge being at least partially a volume effect and representing essentially a homocharge, in contradistinction to the combination of homocharges and heterocharges which are present in electrets.

While some polaret-like materials have been made, there has been a definite need in the art for polarets having higher charges and longer life. The present materials not only possess high charges and long life but also are more useful for many applications than the presently known materials.

For example, the present polaret structures are particularly useful in filters for tobacco smoke, since they possess relatively high charges, thereby permitting greater removal of undesirable materials from the tobacco smoke and since they permit simple but effective configurations of electrically charged materials in a filter heretofore unattainable with the known materials. For example, they permit simple but effective configurations of electrically charged materials in a filter wherein positive charges and/or negative charges papear on both sides of the structure.

By means of the present invention, novel polaret structures are produced which possess properties superior to the properties of the polarets in the art. In addition to being particularly useful in filters for tobacco smoke, the present polaret structures have been found useful in other types of filters, such as air filters, and to be useful in devices such as electrometers, microphones, generators and dosimeters.

The present polaret structures are also particularly useful for the storage of information. They may be employed effectively as tapes and the like for the electronic storage of signals, as will be set forth in more detail later in this specification.

The metallized polarets which may be employed in the present invention may be prepared from a polaret-forming material. The polaret-forming materials should also preferably have a volume resistivity of at least $10^{12}$, and most preefrably $10^{14}$ ohm-cm., at room temperature. The polaret-forming material may, for example, be polymeric materials such as cellulose acetate, poly(vinylidene chloride), poly(chlorotrifluoroethylene), poly(tetrafluoroethylene), poly(vinylchloride), poly(methylmethacrylate) and, as set forth above, polyethylene terephthalate and the like.

The polaret-forming materials may also be inorganic materials such as ceramics and the like. For example, they may be alkaline earth metal titanates, zirconates, or the like, in ceramic or single crystalline form.

The polaret-forming material is preferably employed in the form of a sheet or film which may vary in thickness from about 0.1 to about 5.0 mils and which may be any desired width. For example, the sheet or film may be about 5 mils in thickness and may be an inch or less in width or it may be 10 feet or more in width.

The polaret-forming material is provided with a layer of conducting material, such as a metal or carbon composition, which provides a backing for the polaret-forming material.

The conducting material should, preferably, be in the form of a relatively uniform layer having a thickness of at least 100 Angstroms. The layer may be a deposited layer of aluminum, silver, nickel, copper, or the like; which has been applied by vacuum applicaton, sputtering techniques, or by other means. Such a layer may vary from molecular thickness to 10 mils in thickness or more, so long as it functions as an electrical conductor. The conducting material might also be in the form of a sheet or film of metal, such as aluminum, tin, silver, nickel, copper, stainless steel, which is 0.01 mil to 1 inch or greater in thickness. The conducting material should, preferably, extend substantially across the entire surface of one of the charged surfaces of the polaret-forming material.

Other conducting materials than metal or carbon may also be employed as the conducting layer, provided only that they can be held on the polaret-forming material sufficiently well, can be made as a substantially uniform layer and are conducting in nature. For example, a thin layer of adhesive containing uniformly distributed graphite particles, carbon particles or conducting metal particles capable of imparting electrical conductivity to the conducting layer.

For certain applications, it is advantageous to employ a magnetic materials as the conducting layer. For example, the conducting layer may comprise a magnetic nickel-iron alloy which may be applied to the polaret-forming material as a thin film. Other magnetic materials include iron, nickel, and cobalt in various forms and combinations. A particularly effective magnetic conducting layer can be made of nickel-iron alloys such as the Permalloys. These alloys and their methods of manufacture, are discussed in detail in pages 277–334 of Physics of Thin Films, Advances in Research and Development, Volume 1 (1963), edited by Georg Hass (Academic Press, New York and London).

Such a magnetic conducting layer serves a two-fold purpose and can be especially useful for applications involving the storage of large amounts of information, since the information can be retained both magnetically and electrically by such a material. Magnetic material of this type can also be utilized advantageously in applications involving filtration of charged aerosols.

If a metal sheet or film is employed, it may be held in place on the polaret-forming material by means of a suitable adhesive or by partially melting or dissolving the polaret-forming material so that it serves as an adhesive.

The metallized backing may be applied to either of the charge-bearing sides of the polaret-forming material, i.e., to either the positive or negative side of said materials, if said material has already been formed into a polaret.

The metallized backing may also be applied to the polaret-forming material prior to its formation into a polaret. Under such circumstances, the metallized backing, when in sheet form, may be applied to the polaret-forming material by means of an adhesive. The metallized backing may also be applied by partially melting the polaret-forming material and permitting the melted material to function as an adhesive. The metallic or metallized backing may also be applied to the polaret-forming material, either before or after the polaret-forming material has been converted to a polaret, by conventional vacuum deposition techniques and the like. For example, a conventional commercially available sheet of metallized polyethylene terephthalate (metallized "Mylar"), can be employed effectively as the metallized polaret-forming material for conversion to a metallized polaret in accordance with the present invention.

It is advantageous to apply the metallized backing to the polaret-forming material prior to the polaret formation, since in such a case the metallized backing may serve as one of the electrodes during the polaret-forming operation, wherein the charge is imparted to the polaret-forming materials and the same is converted to a polaret.

The metallized polarets employed in the present invention comprise polarets having two opposite sides, each having an electrical charge differing from the other, one of said sides having an adherent conductive layer attached thereto over substantially its entire surface. Thus, the term "metallized polarets" as used throughout this specification, is intended to encompass polarets having an adherent conductive layer attached thereto, whether the layer is made of metal, carbon or some other electrically conductive material. The conductive layer may be a sheet of conducting material, such as aluminum or tin foil, or may be a layer of conducting material, such as carbon particles, graphite, brass, copper or bronze particles which have been sprayed on, using a suitable adhesive, such as nitrocellulose, polyurethane, ethyl cellulose, waxes, and the like, or it may comprise a conducting material, such as aluminum, which have been vacuum deposited on the polaret or polaret-forming material or the conducting layer may be applied in some other suitable manner.

As discussed above, the polarets may be prepared prior to or after the application of the metallized backing to the polaret-forming material. In either case, the same conditions may be employed to convert the polaret-forming material to polarets. The following discussion with regard to one general method which may be employed for the conversion of the polaret-forming material to polarets applies equally as well to the production of polarets from polaret-forming materials either with or without metallic backing.

While the process of the present invention is particularly valuable for the production of polyethylene terephthalate polarets, it can also be employed for the manufacture of other types of polarets employing polaret-forming materials. The polaret-forming materials which may be employed are set forth earlier in this specification.

The polyethylene terephthalate which may be employed in accordance with the present invention can be the conventional polymer in film form, for example, it may be film of the type marketed under the trade name Mylar. It may also comprise a solid piece of polyethylene terephthalate for example, a disk of this material, or it may comprise a solid material which is composed mainly of polyethylene terephthalate but which may contain minor amounts of other materials. It may also be coated with water repellent materials, such as silicone resin or polytetrafluoroethylene. It may also contain semiconductors or ferroelectrics such as barium or calcium titanate, or may be coated with resins containing such semiconductors or ferroelectrics.

The number average molecular weight of the polyethylene terephthalate material used is normally from about 15,000 to about 25,000. The size and shape of the piece of polyethylene terephthalate may vary. For example, it may be disk shaped, doughnut shaped, dumbbell shaped, pyramid shaped or the like. However, it should preferably have two relatively flat surfaces which are on opposite sides of the piece, such as in a flat sheet or plate.

The polaret-forming material may be in film or sheet form or may comprise a solid piece. The size and shape of the piece of polaret-forming material may vary depending upon the particular embodiment of the process which is employed. However, it should preferably have two relatively flat surfaces which are on opposite sides of the piece, such as in a flat sheet or plate. For the continuous process embodiments for making the metallized polarets of the present invention, the polaret-forming material should, as will be set forth in more detail later in this specification, be in such a form as permits such operation.

The process for producing the polaret portion of the metallized polarets of the present invention comprises in general, placing a solid piece of polaret-forming material between two electrodes and applying an electric field by means of two electrodes across the polaret-forming material at a temperature below the glass temperature of the polaret-forming material.

The electric field which is maintained across the polaret-forming material during the preparation of the polaret in accordance with the process of the present invention may vary from about 0.05 to about 2000 kv./cm., but is preferably about 50 to 200 kv./cm. The electric field is provided by means of any suitable direct current power supply, which is connected to at least one pair of electrodes which, for example, may be flat plates. The voltage which is required will depend on the spacing of the electrodes. For example, when flat plates are employed, the voltage may be determined from the formula:

$$E = V/d$$

where E is the electric field (in kilovolts per centimeter), V is the voltage applied between the plates (in kilovolts), and $d$ is the distance between the plates (in centimeters). Thus, for example, a voltage of 4 kilovolts (4,000 volts) will be necessary to provide a field of about 200 kilovolts per centimeter, when the spacing between the plates is about 0.02 cm.

Before being placed between the electrodes, the polaret-forming material, for example, polyethyleneterephthalate, is either obtained or made into a suitable shape, for example, disk shaped, plate shaped, sheet or rod shaped, or the like, tube shaped, bundles of tubes to use in filter, before undergoing the polaret-forming steps of the present invention.

If a preferred embodiment of the present invention, the polaret-forming material employed in the metallized polarets is preferably in the form of a sheet, ribbon, rod or other so-called continuous form, all of which, it will be understood, are encompassed by the word "sheet" as employed herein. As will appear later in this specification, the polaret-forming material is for some embodiments of the invention preferred in flexible sheet form, as compared with sheet form, which includes flexible, semi-rigid and rigid forms of the material. The sheet can be moved through the electric field under conditions such that each portion of the sheet is suitably exposed to the necessary conditions of time, electrical field and temperature to obtain the desired result.

When the piece of polaret-forming material is not in sheet form, it may be in the form of a piece which may vary greatly in size and shape. However, it will generally have a thickness of from about 0.25 to about 10 mils and, for convenience, will be referred to hereinafter as a disk, it being understood, however, that any suitable shape of polaret-forming material may be employed.

In a most preferred method for preparing the metallized polarets employed in the present invention, a sheet of metallized polaret-forming material, preferably in a continuous form, i.e., in the form of a relatively long piece, is moved through a zone in such a manner that the metallized backing on the polaret-forming material becomes an electrode and an electric field is created between the metallized backing and a second electrode, the polaret-forming material passing through said electric field.

When the following discussion is directed primarily at the formation of a single polaret, it is to be understood that more than one polaret or metallized polaret can be formed at a single time, the conditions of time, temperature and the like being substantially the same, except that the time and appied voltage will vary, depending upon the number of disks or plates which are involved.

The disk may be placed between two disks of aluminum foil or similar material and for one embodiment of the invention, a stack of metallized disks is employed with the metallized portion dividing each polaret-forming material from the next. The disk or disks are then placed between metal electrodes, such as stainless steel disks or any other suitable material, having the same shape or being sufficiently large to cover the entire surface of the disk made of polaret-forming material, such as polyethylene terephthalate. Thus, for example, the resulting assembly comprises a polyethylene terephthalate disk, sandwiched between two pieces of aluminum foil being in contact with a stainless steel electrode. The polaret-forming material should, preferably, be larger than the stainless steel electrodes by a margin or border of at least 20 millimeters in order to prevent any electrical breakdown in the surrounding atmosphere. The disk, for example, in an assembly such as described above, is maintained at a temperature below the glass temperature of the polaret-forming material and, preferably, at room temperature, i.e., 20–30° C., and a voltage is applied, for example, between stainless steel disks, to give a field strength of from about 0.5 to about 2000 kilovolts per centimeter and preferably from about 100 to 600 kilovolts per centimeter. The voltage is maintained in this manner for a period of from about $10^{-6}$ seconds to about 12 hours or more and, preferably, from about 0.01 second to about 1 hour. The polaret can then be separated from the electrodes and form the aluminum or similar foil, when such foil has been employed, and is then ready for use as a polaret.

The polaret can be, if desired, placed or maintained in a "keeper," for example, a wrapping of aluminum foil or the like, in order to preserve the charges thereon until use.

In another embodiment a sheet or other continuous form of polaret-forming is passed through a temperature controlled zone, which is maintained in association with an electric field.

The polaret-forming material may be in flexible sheet form, for example in the form of 0.1–50 ml sheeting or or may be in ribbon form, tape form or any other form which is relatively continuous in nature and which permits passage of the polaret-forming material through several distinct zones in a relatively continuous operation. The polaret-forming material for this embodiment is preferably constructed in such a manner that it possesses two relatively flat, relatively parallel surfaces which, after the polaret is formed, will constitute the oppositely charged faces of the polaret. The material is also preferably of such a nature chemically and physically that it can be made in sheet form or the like. Thus, the polaret-forming material should be capable of formation, for example, by extrusion, in a relatively continuous form and, where it is to be passed through a non-linear path, it should preferably be relatively flexible when in sheet form.

In the zone wherein the polaret-forming material is converted to a polaret, an electric field is maintained across the polaret-forming material. The electric field may vary from about 0.05 to about 2000 kilvolts per centimeter and may be provided, for example, by means of flat plates between which the voltage is applied from a suitable source of direct current power supply. The temperature which is maintained in this zone may vary from a very low temperature such as −100° C. or lower to a temperature below the glass temperature of the polaret-forming material. However, it is preferably maintained at room temperature, i.e., about 20 to 30° C. The polaret-forming material is then passed through said zone at a rate which is sufficient to maintain any one point on the polaret-forming material in said zone for a period of from about one microsecond to 12 hours or more. When the polaret-forming material is polyethylene terephthalate, which is the preferred material of the present invention, this zone should preferably be maintained at a temperature below about 80° C. and should, most preferably, be maintained at a temperature of from about 20° C. to 30° C.

The polaret-forming zone discussed above may comprise the space between conducting plates, such as highly polished steel plates, which are maintained at a temperature which is sufficient to maintain the zone between the plates at the desired level and between which the desired voltage is maintained, or may comprise the space between heated rolls, such as polished aluminum or steel rolls, which are sufficient to accomplish the same result.

The conducting layer may, if desired, be applied to the polaret after it has been formed. Preferably, however, the conducting layer is applied to the polaret-forming material prior to its conversion into a polaret. As will be described hereinafter, operating in this manner permits simplified and improved methods of manufacture. Alternatively, the novel structure of the present invention can be prepared by joining together two polaret-forming materials by means of a conducting adhesive layer.

The continuous process for manufacturing polarets can have various modifications in order to accomplish the desired results. However, simple passage of the polaret-forming material, either with or without a conducting layer, between plates, as indicated above, or between charged rollers for a sufficient period of time to subject the polaret-forming material to the conditions set forth above, provide satisfactory means for accomplishing the purpose of the present invention. Obviously, many combinations of belts, rollers, plates and the like may be employed. One of the most preferred methods for producing the metallized polarets of the present invention is illustrated in FIG. 2 in the attached drawing, which will be described hereinafter in detail.

In the manufacture of polarets, it is of advantage from a commercial viewpoint to manufacture the polarets by a continuous process. Such a process would normally involve the use of rollers or plates, whereby the polaret-forming material passes around and by said rollers, which are heated or cooled in accordance with the particular requirements of the system. One problem which results from manufacturing in this manner arises from the fact that different lengths of time are required for contact of the material with the electric field and exposure of the material to the temperature which is required. Configurations which are particularly advantageous in order to achieve the desired degree of electrical contact and temperature control will be discussed later in this application in connection with the attached drawing.

One of the most effective methods for utilizing a continuous process for the production of metallized polarets involves the use of the metallized backing as an electrode. Thus, particularly preferred embodiments of the present invention include the continuous production of metallized polarets by means of methods wherein the metallized backing on the polaret-forming material is contacted by suitable means, for example, brushes or rollers, to impart a charge thereto and an opposite charge is imparted to the side of the polaret-forming material which is opposite the metallized or conducting backing on the metallized polaret. While the charge is applied, the metallized polaret-forming material is passed through a zone maintained under the temperature conditions which are set forth earlier in this specification.

Polaret structures or sandwiches formed in accordance with the present invention may be used in filters for tobacco smoke, as will be discussed in more detail later in this application. They may, for example, be used in a a cigarette filter by being cut into pieces about 0.5 mil thick by 2 mm. wide by 5–20 mm. in length and crimped or uncrimped placed in a longitudinal direction with a conventional filter cylinder in such a manner that one end of each piece of conducting material in the polaret structure is in contact with the smoker's mouth, i.e., is grounded by means of the moisture in the smoker's mouth.

The effectiveness of the present materials as components of filters for tobacco smoke is based on the fact that they are capable of removing charged particles therefrom.

The non-gaseous portion of cigarette smoke is generally composed of three types of particles, on an electrical basis. They are, in general, positively charged particles, negatively charged particles and neutral particles. Generally, approximately half or somewhat less of the particles in tobacco smoke are electrically neutral and the remainder of the particles are about evenly divided between positive particles and negative particles.

The removal of charged particles from tobacco smoke has often been found desirable, in order to selectively eliminate undersirable smoke constituents and to aid in overall filter efficiency.

The removal of certain charged particles is also believed to accomplish certain physiological and psychological effects. Filters incorporating the polaret structures of the present invention provide a means for the controlled removal of one or both kinds of charged particles from tobacco smoke. They can be employed as well in any other application in which particulate matter is to be removed from a gaseous medium.

While polarets have been employed to remove certain charged particles from tobacco smoke, they have been found to have limited effectiveness for this purpose for a number of reasons. For example, the fact that the polarets possess different charges on each face does not permit a net field when they are used in a filter or other device. Thus, there is no opportunity for selectivity in employing such materials unless unusual and difficult steps are taken to incorporate the polarets in the filter structure in such a manner that the charges can be adequately controlled to accomplish a desired result. In other words, there is no effective way in which to ground such polarets.

Metallized polarets overcome many of the disadvantages of the ordinary polarets and make possible a new type of electrically charged material for use in filters. The use of the metallized polarets in filters as disclosed in our copending application filed of even date herewiith and entitled "Metallized Polarets, Methods for Their Production and Filters Containing the Same," Ser. No. 503,-134, permits the advantageous distribution of single charges in a filter with the accurate control of the charge distribution within the filter. The present polaret "sandwich" structures provide even greater advantages in filter applications, since they can be given varying charges, by a simple method, and can thereby provide unique and advantageous configurations of charge patterns in filter constructions.

The present polaret structures also make possible a new type of material and a new method for the storage of information. They can be employed as electronically-receptive tapes for use in tape recorders and similar devices, being adaptable to the superimposition on the charged polaret surface of a pattern of electronic signals which may be imparted thereto under conditions similar to those set forth earlier in this application. They permit the storage of electrically recorded information, simultaneously on two sides of a tape, with not interference between sides.

It is possible to employ a polaret sandwich tape upon which a series of signals are superimposed on each side by suitable means such that each side of the tape becomes, in effect, a series of polarets which are connected together, either directly or with intervals where no charge is imposed on the electret-forming material. Such tapes are particularly valuable when the metallized backing on the polaret forming material is magnetic in nature, since such tapes permit the superimposition thereon of a plurality of signals, both electric and magnetic, to permit the simultaneous recording of several signals along the same lenth of tape. Such tapes have obvious value for such fields as television recording, wherein a visual signal and a stereophonic audio signal are simultaneously received and recorded.

The ability of the present double surfaces of a tape made from the polaret sandwiches to hold electrical charges of varying degree and/or opposite sign, even though those charges are immediately adjacent to one another or opposite one another on the tape, permits the utilization of these materials as recording tapes as indicated above and also permits their use in the manufacture of filter elements. Such filter elements can have a variety of charges in a variety of patterns and can be shaped in accordance with a multitude of designs for filter applications in such a manner that positive and negative charges can be formed in many different arrays in order to best accomplish the purposes of the particular aerosol filtration involved. It is particularly advantageous, for certain applications, that the metallized backing be magnetic in nature so that a particular filter construction can employ electric as well as magnetic means for the removal of undesirable particles from the aerosol.

The invention is more fully illustrated in the attached drawing, wherein:

FIG. 1 is a schematic view of one embodiment of the present invention.

FIG. 2 is a schematic view of a second embodiment of the present invention.

FIG. 3 is a schematic view of the third embodiment of the present invention.

FIG. 4 is a schematic view of a fourth embodiment of the present invention.

FIG. 5 is a schematic view of a fifth embodiment of the present invention.

FIG. 6 is a schematic view of a sixth embodiment of the present invention.

FIG. 7 is a schematic view of a seventh embodiment of the present invention.

FIG. 8 is a schematic view of an eighth embodiment of the present invention.

Referring more particularly to FIG. 1, a polaret structure or "sandwich" 5 is shown in isometric view. A layer of polaret forming material 10 is shown with a conducting layer 11 attached thereto. A similar layer of electret-forming material 12 with a conducting layer 13 attached thereto is attached along the surface of conducting layer 13 to the surface of conducting layer 11 by means of adhesive layer 14. In the polaret-forming materials, positive charges are indicated at A and negative charges are indicated at B. In the conducting layers, positive charges are indicated at C and negative charges are indicated at D.

Referring more particularly to FIG. 2, a preferred method for producing the polaret sandwiches of the present invention is schematically illustrated. In FIG. 2 a sandwich 15 comprises successive layers as follows: polaret-forming layer 20, conducting layer 21, adhesive layer 24, conducting layer 23 and polaret-forming layer 22, introduced into Zone A through opening 42. Zone A is maintained at a temperature below the glass temperature of the polaret-forming material. Conducting layers 21 and 23 are grounded. Negatively charged rolls 35, 36, 37 and 38 move in the indicated directions carrying sandwich 15 through zone A and out through opening 48. Belts 47a and 47b are made of a conducting material, such as polished stanless steel and the charge on rolls 35 and 36 and 37 and 38 are imported to belts 47a and 47b respectively, whereby a field is formed between the surface of belts 47a and 47b and the conducting layers 21 and 23, respectively, of sandwich 15.

The use of zone A is desirable in order to maintain a uniform temperature in the polaret-forming operation. However, the same operation may simply be conducted in an open room, provided the temperature is maintained so that the glass temperature of the polaret-forming material is not reached.

Referring more particularly to FIGS. 3 and 4, there is shown a cigarette 61 having a paper cylinder 62, defining the body of the cigarette. Shredded tobacco 63 (also referred to herein as "filler") is contained within cylinder 62. Paper cylinder 64 is positioned at the other end from the shredded tobacco so that its end abuts one end of paper cylinder 62. Cylinder 64 generally defines the filter unit of cigarette 61. The filter unit, which is defined by paper cylinder 64 is joined to the filler section, which is defined by paper cylinder 62, by paper cylinder 65, which covers all of paper cylinder 64 and a portion of paper cylinder 62. The filter section defined by paper cylinder 64 contains a polaret sandwich 66, having polaret layer 66a, which has a positive charge on its outer surface, conducting layer 66b, adhesive layer 66c, conducting layer 66d, and polaret layer 66e, which has a positive charge on its outer surface. The metallized polaret 66 is generally spirally wound within cylinder 64, as indicated. In this embodiment, the spaces formed by polaret sandwich 66 in cylinder 62 are filled by cellulose acetate fibers 67, although other filter materials may be employed, if desired, or the space may be left empty. It is important, however, that conducting layers 66b and 66d be in contact with the smoker's mouth, and are thereby grounded, when cigarette 61 is smoked.

Referring more particularly to FIGS. 5 and 6, there is shown a cigarette 71 having a paper cylinder 72, defining the body of the cigarette. Shredded tobacco 73 (also referred to herein as "filler") is contained within cylinder 72. Paper cylinder 74 is positioned at the other end from the shredded tobacco so that its end abuts one end of paper cylinder 72. Cylinder 74 generally defines the filter unit of cigarette 71. The filter unit, which is defined by paper cylinder 74 is joined to the filler section, which is defined by paper cylinder 72, by paper cylinder 75, which covers all of paper cylinder 74 and a portion of paper cylinder 72. The filter section defined by paper cylinder 74 contains polaret sandwiches 76, each of which has a polaret layer 66a, which has a positive charge on its outer surface, conducting layer 66b, adhesive layer 66c, conducting layer 66d and polaret layer 66e, which has a positive charge on its outer surface. The polaret sandwiches 76 are positioned substantially longitudinally in cylinder 72 with one end of each conducting layer 76b and 76d extending to the end of the filter, so that each conducting layer is in contact with the smoker's mouth, and is thereby grounded. In this embodiment, the spaces formed by polaret sandwiches 76 in cylinder 72 are filled with cellulose acetate fibers 67, although other filter materials may be employed, if desired, or the space may be left empty.

Referring more particularly to FIGS. 7 and 8, there is shown a cigarette 81 having a paper cylinder 82, defining the body of the cigarette. Shredded tobacco 83 (also referred to herein as "filler") is contained within cylinder 82. Paper cylinder 84 is positioned at the other end from the shredded tobacco so that its end abuts one end of paper cylinder 82. Cylinder 84 generally defines the filter unit of cigarette 81. The filter unit, which is defined by paper cylinder 84 is joined to the filled section, which is defined by paper cylinder 82, by paper cylinder 85, which covers all of paper cylinder 84 and a portion of paper cylinder 82. The filter section defined by paper cylinder 84 contains a plurality of polaret sandwich cylinders 86, each having polaret layers 86a, which has a positive charge on its outer surface, conducting layer 86b, adhesive layer 86c, conducting layer 86d and polaret layer 86e, which has a positive charge on its outer surface. The cylinders 86 are positioned substantially longitudinally in cylinder 82 with one end of each of the conducting layers 86b and 86d extending to the end of the filter, so that each is in contact with the smoker's mouth, and is thereby grounded. In this embodiment, the spaces formed by metallized polarets 86 in cylinder 82 are filled with cellulose acetate fibers 87, although other filter materials may be employed, if desired, or the space may be left empty.

Example 1

A Mylar polaret sandwich (approximately 2 mils thick) is cut into a strip 22 cm. long. and 1.5 cm. wide. The polaret is charged positively on both sides at about $10^{-8}$ coulombs/cm.$^2$. The strip is cut into pieces and inserted into a tube 30 mm. long. The tube is then affixed to a cigarette with adhesive tape. The same type cigarette without the polaret filter tube is used as the control. The following procedures are used to determine the net charge on the smoke of both the control and the experimental cigarette. A Sequence Smoker (General Electric design), a Charge Collector (G.E. design), a micro-micro-ammeter (Keithley 410), a Smoke Charge Integrator (Jefferson Research Laboratories), a Space Charge Control Consol (G.E. design), a Fisher Air Pump, and a Texas Instrument Rectiriter (10 mv.) are assembled and calibrated. The cigarettes to be tested are weighed and their resistance-to-draw (RTD) is determined. First, the control cigarette is placed in the smoker ports of the sequence smoker. The vacuum pump is engaged and the Dwyer flow gauge of the Control Consol is adjusted to 2.4 (1050 cc./min.). The micro-micro-ammeter is zeroed, the integrator function knob is turned to "Operate," and the recorder chart drive is engaged. The sequence smoker drive motor is engaged, and the cigarette is lighted as the port in use passes the vacuum take-off position. As the cigarette is lighted, a stop watch is engaged. When approximately 35 seconds have elapsed after puffing, the integrator function knob is turned to "set." This returns the recorder pen to midscale. After 55 seconds have elapsed from puff time, the function knob is returned to "operate" position in preparation for the next puff. This procedure is followed until completion of the run with both the control and the experimental cigarette.

The net charges are calculated from this formula:

$$\text{Charge} = \left(\frac{\text{recorder deflection}}{\text{full scale deflection}}\right)$$

[Integrating time (sec.)]$^{\mu\mu}$ ammeter sensitivity (amps.)

The average of ten puffs for the control cigarette is determined as $(-1.3 \pm 0.8) \times 10^{-11}$ coulombs per puff. The cigarettes with the electrostatic filter result in a charge on the smoke of $+2.1 \times 10^{-10}$ coulombs/puff, showing that a selective removal of particles from the smoke having one charge or the other had been achieved.

Example 2

A sandwich of one mil aluminized Mylar was made, using a polyurethane adhesive. This was made into a unicharged polaret by applying a potential of 600 volts to each side for 10 seconds so that the overall charge was positive and had an average value of $4 \pm 1 \times 10^{-9}$ coulombs/cm.$^{-2}$. By grounding the aluminum backings and applying a negative potential of 700 volts, on a knife-edge, parallel negative lines were printed on the positive background about $4 \pm 1$ mm. apart. This was cut to $20 \times 1.5$ cm. so that the negative lines ran at about a 45° angle to the edge. The polaret was then inserted into a glass tube which was affixed to the same type of cigarettes as used in Example 1. The control and test cigarettes were smoked and the net charge on the smoke was determined as described in Example 1. The charge on the smoke was charged from $-1.3 \times 10^{-11}$ to $+3.4 \times 10^{-10}$ coulombs/puff.

Example 3

An adhesive was not used for this experiment. Two polarets of one mil aluminized Mylar were made by applying to each a potential of $-3$ kilovolts for 10 seconds. A charge of $-24 \times 10^{-9}$ coulombs/cm.$^2$ was obtained. These two discs were then placed with the aluminized backing touching and were grounded. In this configuration, each side had an electric charge of $-24 \times 10^{-9}$ coulombs/cm.$^2$.

As used throughout this specification, unless otherwise specified, all parts and percentages are by weight. In addition, the following definitions apply:

Volume resistivity is the resistance that a centimeter cube of a substance offers to the passage of electricity, the current being perpendicular to the two parallel faces of the cube.

Glass temperature, which may also be referred to as glass transition temperature or as second order transition temperature, is the temperature at which the free energy, entropy and enthalpy curves are continuous and the heat capacity curve is discontinuous for an amorphous polymer or in an amorphous region of a crystalline polymer. The glass temperature is characterized as the point at which there is a change in the molecular freedom of a material and is further characterized as a point of change between a rigid state or structure of a material and a rubbery state of a material.

We claim:

1. An article of manufacture comprising a polaret having at least two substantially parallel surfaces, one of said surfaces having adhered thereto a layer of conducting material, a second polaret having at least two substantially parallel surfaces, one of said surfaces having adhered thereto a layer of conducting material, and an intermediate layer of adhesive material binding said two polarets together by means of the respective layers of conducting material in such a manner that electrical contact is maintained between said two conducting materials.

2. The article of manufacture of claim 1 wherein the adhesive layer contains particles of a conducting material uniformly distributed therethrough in sufficient amount so that said adhesive layer is rendered electrically conductive.

3. The article of manufacture of claim 2 wherein said conducting particles are particles of carbon.

4. The article of manufacture of claim 2 wherein said conducting particles are metallic particles.

5. An article of manufacture comprising a polaret having at least two substantially parallel surfaces, one of said surfaces having adhered thereto a sheet of metallic material, a second polaret having at least two substantially parallel surfaces, one of said surfaces having adhered thereto a sheet of metallic material, and an intermediate layer of adhesive material binding said two polarets together by means of the respective sheets of metallic material in such a manner that electrical contact is maintained between said two sheets of metallic material.

6. An article of manufacture comprising two polarets, each of which has at least two substantially parallel surfaces, one of the said parallel surfaces of one polaret having adhered thereto a layer of conducting material, said layer of conducting material also having adhered thereto one of said parallel surfaces of the second polaret, whereby a structure results having two substantially parallel polarets joined together by a conducting material.

References Cited

UNITED STATES PATENTS

| 2,740,184 | 4/1956 | Thomas | 161—64 X |
| 2,916,038 | 12/1959 | Wade | 131—262 X |
| 3,005,707 | 10/1961 | Kallmann et al. | 96—1 |
| 3,138,517 | 6/1964 | Charbonneau | 161—214 X |
| 3,268,331 | 8/1966 | Harper | 96—1 |
| 3,316,620 | 5/1967 | Stewart | 161—411 X |
| 3,354,373 | 11/1967 | Fatovic | 307—88 X |
| 3,359,145 | 12/1967 | Salyer et al. | 156—331 X |

OTHER REFERENCES

F. Gutmann: "The Electret," Reviews of Modern Physics, vol. 30, No. 3 (July 1948), pp. 457–471.

EARL M. BERGERT, *Primary Examiner.*

R. A. KILLWORTH, *Assistant Examiner.*

U.S. Cl. X.R.

131—262; 161—213, 411; 252—63.2; 307—88; 317—3